United States Patent
Kim et al.

(10) Patent No.: US 9,133,760 B2
(45) Date of Patent: Sep. 15, 2015

(54) BRAKE NEGATIVE PRESSURE GENERATING DEVICE FOR VEHICLE

(71) Applicant: Hyundai Motor Company, Seoul (KR)

(72) Inventors: Yoon Joo Kim, Yongin-si (KR); Hyun Jun Lim, Incheon (KR); Dong Hee Han, Seoul (KR); Seung Kook Han, Suwon-si (KR); Jong Il Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 71 days.

(21) Appl. No.: 14/056,478

(22) Filed: Oct. 17, 2013

(65) Prior Publication Data

US 2014/0182565 A1 Jul. 3, 2014

(30) Foreign Application Priority Data

Dec. 27, 2012 (KR) .................. 10-2012-0155384

(51) Int. Cl.
*F02B 33/44* (2006.01)
*F02B 33/00* (2006.01)
*F02B 37/04* (2006.01)
*F02B 37/10* (2006.01)
*F02B 37/16* (2006.01)

(52) U.S. Cl.
CPC ................. *F02B 37/04* (2013.01); *F02B 37/10* (2013.01); *F02B 37/16* (2013.01); *Y02T 10/144* (2013.01)

(58) Field of Classification Search
CPC .......... F02B 37/04; F02B 37/10; F02B 37/16; B60T 13/46; B60T 13/52; Y02T 10/144
USPC .......................... 60/598, 605.1, 612; 123/565
See application file for complete search history.

(56) References Cited

U.S. PATENT DOCUMENTS

2013/0333665 A1* 12/2013 Pursifull .................. 123/399

FOREIGN PATENT DOCUMENTS

| JP | 2000-282906 A | 10/2000 | |
|---|---|---|---|
| KR | 2002-0080868 A | 10/2002 | |
| KR | 20020080868 A * | 10/2002 | .............. B60T 13/46 |
| KR | 10-2012-0006239 A | 1/2012 | |

* cited by examiner

*Primary Examiner* — Audrey K Bradley
(74) *Attorney, Agent, or Firm* — Morgan, Lewis & Bockius LLP

(57) ABSTRACT

A brake negative pressure generating device of a vehicle includes: an electrically-driven supercharger for drawing in, compressing, and supplying outside air; a vacuum chamber connected to an inlet opening of the electrically-driven supercharger and supplying negative pressure for brake force boosting; a negative pressure supply passage for connecting the inlet opening of the electrically-driven supercharger and the vacuum chamber; and a first negative pressure control valve for opening and closing an inlet passage. Accordingly, the electrically-driven supercharger is run to supplement brake negative force if the brake negative force is not sufficient.

6 Claims, 1 Drawing Sheet

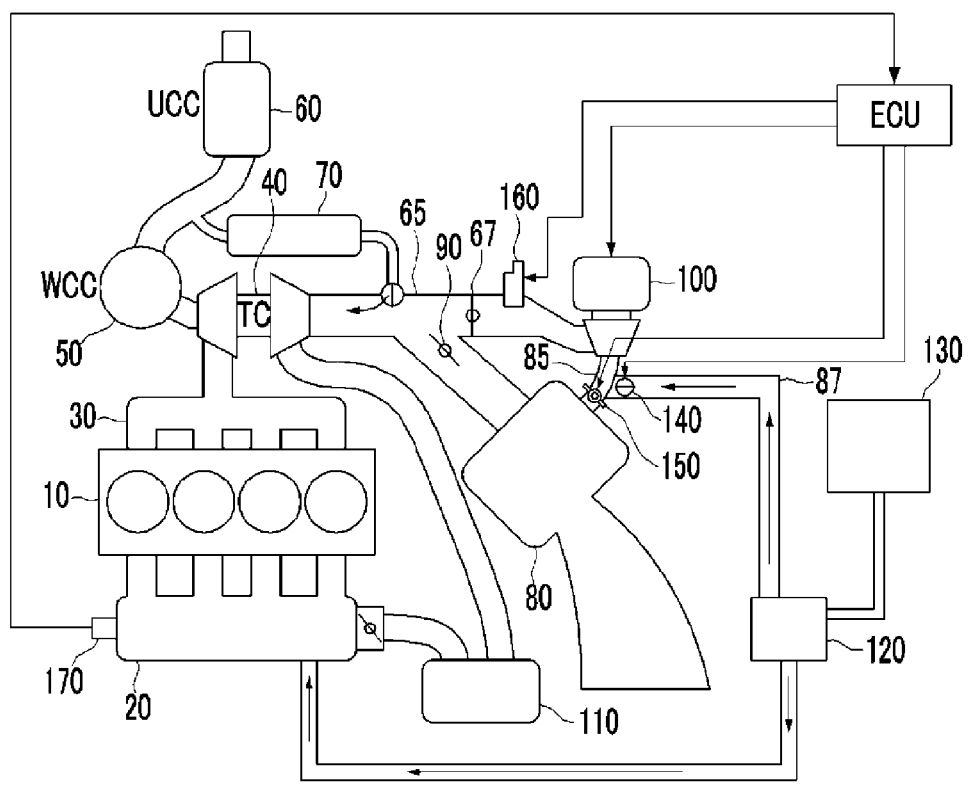

BRAKE NEGATIVE PRESSURE GENERATING DEVICE FOR VEHICLE

CROSS-REFERENCE TO RELATED APPLICATION

The present application claims priority of Korean Patent Application Number 10-2012-0155384 filed Dec. 27, 2012, the entire contents of which application is incorporated herein for all purposes by this reference.

BACKGROUND OF INVENTION

1. Field of Invention

The present invention relates to a brake negative pressure generating device for a vehicle, and more particularly, to a brake negative pressure generating device which generates brake negative pressure by a supercharger when required.

2. Description of Related Art

In general, a vehicle draws external air therein, mixes the air with fuel, and supplies the mixture to an engine, and the engine gets the power required to drive the vehicle by combusting the mixture of air and fuel.

To achieve desired engine output and combustion efficiency, it is necessary to supply a sufficient amount of external air for combustion while generating power by driving the engine. Thus, a supercharger or turbocharger for pressurizing and supplying air for combustion has been adapted for use in vehicles in order to increase engine combustion efficiency and improve engine output.

The supercharger is configured to compress the air to be supplied to the engine by the pressure of the exhaust gas discharged from the engine.

However, there is a limit to compressing drawn air and supplying it to the engine only by the pressure of exhaust gas depending on the vehicle's traveling situation. As such, electrically-driven superchargers have been recently applied to vehicles to compress and supply drawn air by a compressor driven by an electric motor.

In the case of a vehicle using the aforementioned turbocharger or supercharger, if a brake pedal is operated after the engine goes into Wide Open Throttle (WOT) mode by stepping on the accelerator pedal as hard as possible, static pressure in the intake manifold cannot be properly released, though for a short period of time. This leads to a failure to generate sufficient negative pressure for brake force boosting, and hence the brake may be pulled back.

Moreover, when driving the vehicle on hilly roads, negative pressure generated in the intake manifold may not be sufficient for brake force boosting.

If the brake force boosting is not properly done because of insufficient negative pressure for brake force boosting, which is generated in the intake manifold and supplied to the brake system, this might be critical for the safe driving of the vehicle. Due to this, a vacuum pump for supplying sufficient brake negative power is installed in vehicles.

The vacuum pump installed to generate negative power for brake force boosting will increase the weight and cost of vehicles, and hence there is a need for a solution to overcome this problem.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention have been made in an effort to provide a brake negative pressure forming device having the advantage of running an electrically-driven supercharger to properly generate sufficient brake negative pressure if a vehicle using the electrically-driven supercharger fails to obtain sufficient brake negative pressure for brake force boosting.

Various aspects of the present invention provide for a brake negative pressure generating device for a vehicle, the device including: an electrically-driven supercharger for drawing in, compressing, and supplying outside air; a vacuum chamber connected to an inlet opening of the electrically-driven supercharger and supplying negative pressure for brake force boosting; a negative pressure supply passage for connecting the inlet opening of the electrically-driven supercharger and the vacuum chamber; and a first negative pressure control valve for opening and closing the negative pressure supply passage.

The inlet opening of the electrically-driven supercharger may be connected to an air cleaner via an inlet passage, and a second negative pressure control valve may be installed at a position close to the air cleaner, in the inlet passage to open and close the inlet passage.

The second negative pressure control valve may be installed to be closer to the inlet opening of the electrically-driven supercharger than to the first negative pressure control valve.

An outlet opening of the electrically-driven supercharger may be connected to a turbocharger via an intake passage, a control valve for opening and closing the intake passage may be installed in the intake passage, and an air vent valve for selectively communicating the intake passage with the outside may be installed between the intake passage and the outlet opening of the electrically-driven supercharger.

The air vent valve may include a solenoid valve.

The control valve, the first negative pressure control valve, and the second negative pressure control valve may form an integral valve unit.

The brake negative pressure generating device may further include: a pressure sensor for detecting the pressure of the vacuum chamber; and an engine control unit for controlling the electrically-driven supercharger, the air vent valve, the first negative pressure control valve, the second negative pressure control valve, and the control valve according to the detected pressure of the pressure sensor.

If the negative pressure detected by the pressure sensor is below a set valve, the engine control unit may control the first negative pressure control valve to open the negative pressure supply passage and control the second negative pressure control valve to close the inlet passage, control the control valve to close the intake passage, and control the air vent valve to open the intake passage between the control valve and the outlet opening of the electrically-driven supercharger.

According to the brake negative pressure generating deice for the vehicle according to various aspects of the present invention, upon detecting the negative pressure generated in the intake manifold during the running of the vehicle, if the detected negative pressure is deemed insufficient, the electrically-driven supercharger is run to supply brake negative pressure to the vacuum chamber. This makes it possible to always generate appropriate negative pressure, and helps to drive the car with safety.

Furthermore, the weight and cost of vehicles can be cut down since there is no need to use a vacuum pump to generate brake negative pressure.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a block diagram of an exemplary brake negative pressure generating device for a vehicle according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an intake manifold 20 for drawing air or an air-fuel mixture is connected to a cylinder block 10 forming a combustion chamber of an engine, and an exhaust manifold 30 is connected to the cylinder block 10 to discharge exhaust gas generated by combustion in the combustion chamber from the cylinder block 10.

A turbocharger 40 is connected to the exhaust manifold 30 in order to compress the air drawn into the intake manifold 20 by the pressure of the exhaust gas discharged through the exhaust manifold 30.

That is, a turbine and an impeller, which constitute the turbocharger 40, are connected to the exhaust manifold 30 and the intake manifold 20, respectively.

Moreover, a catalytic converter is installed in the intake manifold 30 in order to reduce harmful components in the exhaust gas. The catalytic converter may include a warm-up catalytic Converter 50 and an under-floor catalytic converter 60.

In addition, a recirculation path is formed in an exhaust passage between the two catalytic converters 50 and 60 to return part of the exhaust gas to the cylinder block 10, and an exhaust gas recirculation cooler 70 is installed in the recirculation path to reduce the temperature of the exhaust gas.

An intake passage 65 for drawing in outside air (e.g., ambient air) is connected to the turbocharger 40, and an air cleaner 80 for filtering out impurities contained in the drawn outside air is installed in the intake passage 65.

A bypass valve 90 is installed in a connecting passage between the intake passage 65 and the air cleaner 80.

Further, an electrically-driven supercharger 100 is connected to the air cleaner 80 via an inlet passage 85 to draw in purified outside air through the air cleaner and compress and supply it, and an outlet opening of the electrically-driven supercharger 100 is connected to the intake passage 65 to supply the air compressed in and discharged from the electrically-driven supercharger 100 to the intake passage 65.

A control valve 67 is installed at a position close to the outlet opening of the electrically-driven supercharger 100 in the intake passage 65. The control valve 67 serves as an on-off valve that allows the compressed air discharged from the electrically-driven supercharger 100 to be supplied to the intake passage 65 or blocks it.

A solenoid valve is installed between the control valve 67 and the electrically-driven supercharger 100 to serve as an air vent valve 160 for selectively discharging the compressed air remaining in the intake passage 65 to the outside.

An intercooler 110 is installed in a connecting passage connecting the turbocharger 40 to the intake manifold 20 to cool high-temperature compressed air supplied from the turbocharger 40.

A vacuum chamber 120 is connected to the intake manifold 20 to generate negative pressure by the negative pressure generated in the intake manifold 20, and a brake booster 130 is connected to the vacuum chamber 120 to boost the brake force by the negative pressure of the vacuum chamber 120.

The brake booster 130 boosts the brake force by using the negative pressure of the vacuum chamber 120 when manipulating the brake pedal, thereby increasing the brake force.

Moreover, the vacuum chamber 120 is communicatively connected to the inlet passage 85 via a negative pressure supply passage 87, and a second negative pressure control valve 150 is installed at a position close to the air cleaner 80, in the inlet passage 85 to open and close the inlet passage 85 between the air cleaner 80 and the electrically-driven supercharger 100.

The negative pressure supply passage 87 is connected to a position adjacent to an inlet opening of the electrically-driven supercharger 100, in the inlet passage 85, and a first negative pressure control valve 140 is installed to open and close the negative pressure supply passage 87.

A pressure sensor 170 may be installed at an appropriate position o the intake manifold 20 to detect the negative pressure generated in the intake manifold 20, and the pressure sensor 170 may be installed in a connecting passage between the intake manifold 20 and the vacuum chamber 120.

The pressure sensor 170 is connected to an input terminal of an engine control unit (ECU) so that a pressure signal detected by the pressure sensor 170 is input into an electronic control unit or the engine control unit (ECU).

The control valve 67, the first negative pressure control valve 140, and the second negative pressure control valve 150 may be integrally provided as a single integrated valve unit.

The electrically-driven supercharger 100, the air vent valve 160, the first negative pressure control valve 140, and the second negative pressure control valve 150 are attached to an output terminal of the engine control unit (ECU) to operate in response to a control signal from the engine control unit (ECU).

Upon detecting the negative pressure generated in the intake manifold 20 by means of the pressure sensor 170 during the running of the vehicle, if the detected negative pressure is deemed insufficient for brake force boosting, the engine control unit (ECU) runs the electrically-driven supercharger 100 to supply negative pressure to the vacuum chamber 120.

That is, the engine control unit (ECU) compares the detected negative pressure with a set value, and if the detected negative pressure is below the set value, applies an operation signal to the electrically-driven supercharger 100 to operate.

The engine control unit (ECU) controls the inlet passage 85 to be closed by applying a control signal to the second negative pressure control valve 150, and controls the negative pressure supply passage 87 to be opened by applying a control signal to the first negative pressure control valve 140.

Accordingly, negative pressure is supplied to the vacuum chamber 120 by the intake force of the electrically-driven supercharger 100, thereby enabling normal brake force boosting.

Meanwhile, positive pressure is generated at the outlet opening of the electrically-driven supercharger 100. As such, the engine control unit (ECU) applies a control signal to the control valve 67 to close the intake passage 65, and applies a control signal to the air vent valve 160 to allow the intake passage 65 between the control valve 67 and the outlet opening of the electrically-driven supercharger 100 to communicate with the outside, thereby discharging out the positive pressure generated at the outlet opening of the electrically-driven supercharger 100.

Therefore, there is no need to install a vacuum pump to supplement brake force, because brake negative pressure can be supplemented by running the electrically-driven supercharger 100 if the intake negative pressure generated in the intake manifold 20 is deemed insufficient, and the intake negative pressure can be properly used if the intake negative pressure is deemed sufficient.

Moreover, if the negative pressure generated in the intake manifold 20 is sufficient, the engine control unit (ECU) controls the valves in the opposite way to the above, thereby carrying out normal supercharger functions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake negative pressure generating device for a vehicle, the device comprising:
   an electrically-driven supercharger for drawing in, compressing, and supplying outside air to an engine;
   a vacuum chamber connected to an inlet opening of the electrically-driven supercharger and supplying negative pressure for brake force boosting, the inlet opening of the electrically-driven supercharger being connected to an air cleaner via an inlet passage;
   a negative pressure supply passage for connecting the inlet opening of the electrically-driven supercharger and the vacuum chamber;
   a first negative pressure control valve for opening and closing the negative pressure supply passage,
   a second negative pressure control valve being installed at a position close to the air cleaner, in the inlet passage to open and close the inlet passage,
   an outlet opening of the electrically-driven supercharger being connected to a turbocharger via an intake passage,
   a control valve for opening and closing the intake passage being installed in the intake passage, and
   an air vent valve for selectively communicating the intake passage with the outside being installed between the intake passage and the outlet opening of the electrically-driven supercharger.

2. The brake negative pressure generating device of claim 1, wherein the second negative pressure control valve is installed closer to the inlet opening of the electrically-driven supercharger than to the first negative pressure control valve.

3. The brake negative pressure generating device of claim 1, wherein the air vent valve comprises a solenoid valve.

4. The brake negative pressure generating device of claim 1, wherein the control valve, the first negative pressure control valve, and the second negative pressure control valve form an integrated valve unit.

5. The brake negative pressure generating device of claim 1, further comprising:
   a pressure sensor for detecting a detected pressure of the vacuum chamber; and
   an engine control unit for controlling the electrically-driven supercharger, the air vent valve, the first negative pressure control valve, the second negative pressure control valve, and the control valve according to the detected pressure of the pressure sensor.

6. The brake negative pressure generating device of claim 5, wherein, if the negative pressure detected by the pressure sensor is below a set valve, the engine control unit controls the first negative pressure control valve to open the negative pressure supply passage and control the second negative pressure control valve to close the inlet passage, controls the control valve to close the intake passage, and controls the air vent valve to open the intake passage between the control valve and the outlet opening of the electrically-driven supercharger.

* * * * *